Jan. 20, 1959 W. P. G. LINDNER 2,869,218
CUTTER
Filed March 1, 1955 3 Sheets-Sheet 1

INVENTOR:
Wolfram P.G. Lindner
By
Patent Agent

Jan. 20, 1959　　　W. P. G. LINDNER　　　2,869,218
CUTTER
Filed March 1, 1955　　　　　　　　　　　　3 Sheets-Sheet 2
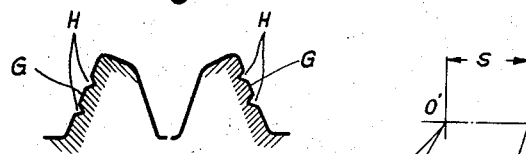
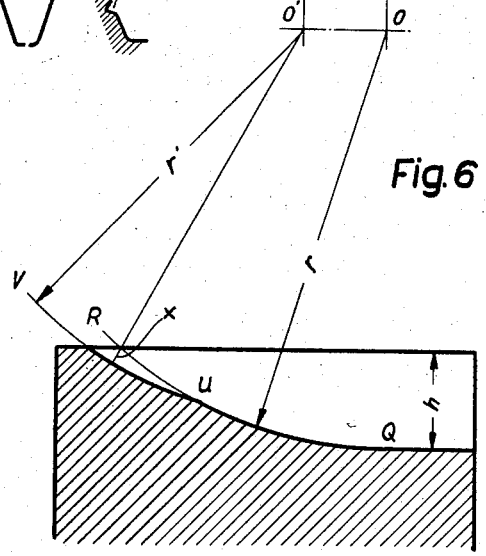
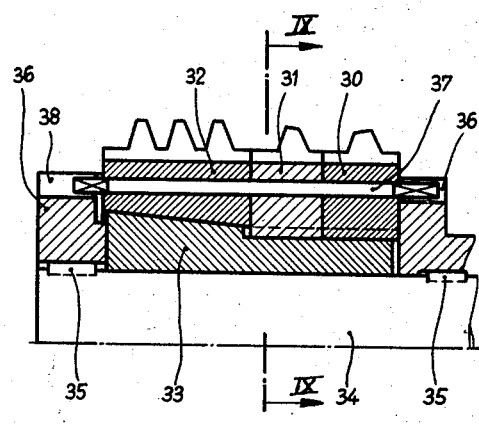
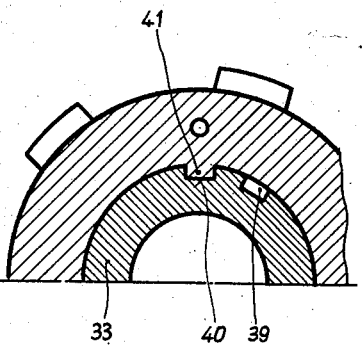
INVENTOR:
Wolfram P.G. Lindner
By
Patent Agent Jan. 20, 1959   W. P. G. LINDNER   2,869,218
CUTTER
Filed March 1, 1955   3 Sheets-Sheet 3

INVENTOR:
Wolfram P.G. Lindner
By
Patent Agent

United States Patent Office 2,869,218
Patented Jan. 20, 1959

2,869,218
CUTTER

Wolfram P. G. Lindner, Stefansbecke, Uber Gevelsberg, Germany

Application March 1, 1955, Serial No. 491,467

Claims priority, application Germany March 12, 1954

2 Claims. (Cl. 29—103)

The present invention relates to a cutter and, while not specifically limited to, is of particular importance in connection with the production of gears according to the hobbing method.

With the heretofore known cutters for producing gears by means of the hobbing method, with single cutters, the cutting teeth succeeding each other are arranged at uniform distance from each other on the same worm spiral. With multiple cutters, the cutter teeth are distributed over a plurality of worm spirals while the cutter teeth of a worm spiral which succeed each other are evenly spaced from each other. Only the first teeth on a worm spiral will act as roughing teeth.

These teeth thus produce a greater chip cross section than the succeeding teeth on the same spiral.

It is an object of the present invention to provide an improved cutter which will increase the cutting performance of the cutter teeth.

It is another object of this invention to provide a cutter of the above mentioned type which will increase the chip cross section at all portions of the cutter which rough the tooth spaces of the work piece.

These and other objects and advantages of the invention will appear more clearly from the following specification in connection with the accompanying drawings in which:

Fig. 6 is a representation of the cutting process seen in the direction of the axis of the cutter.

Fig. 7 is a front view of the roughing teeth.

Fig. 8 is a partial section through the cutter and its arrangement on the cutter spindle.

Fig. 9 is a partial section taken along the line IX—IX of Fig. 8.

General arrangement

In order to increase the cutting performance of cutter teeth, it is advantageous to give the same as great a chip thickness as possible since it has been found that during the cutting operation, the specific cutting pressures increase with decreasing chip thickness. They increase to a greater extent than with other chip removing operations as is for instance the case with turning operations. On the other hand, the specific cutting pressures decrease with increasing chip cross section. This will bring about all advantages inherent to a lower specific cutting pressure.

The invention meets the demand for an increase in the chip cross section on all parts of the cutter which rough the tooth spaces of the work piece, i. e. of all parts which perform the major chip removing work. In conformity with the present invention and in contrast to the heretofore employed practice, the cutter teeth are not arranged in an uninterrupted succession on the worm spiral but are combined into groups. The cutter teeth of a group which follow each other are approximately uniformly spaced from each other with the exception that between the last tooth of a group and the first tooth of the next group there is provided an inter-space of from one to five teeth. In this way each group will possess individual roughing teeth, and therefore the teeth will produce a favorable chip cross section. In this connection it should be borne in mind that when carrying out a milling or cutting operation, a thicker chip requires a lower specific cutting force and thereby subjects the cutting edges of the respective cutting tooth to less stress than is the case when taking off a thinner chip under the same conditions. The depth of the cutter teeth in the groups increases from the first tooth to the last tooth. If the first tooth of a group would have the same depth as the last tooth of the preceding group, the first tooth of each group would have to chip the material which due to the interspace between the groups remains on the work piece. This, however, would mean an overload and would cause the first tooth of a group prematurely to become dull which in turn would make a regrinding of the entire cutter necessary. Therefore, the depth of the first tooth of a group is less than the depth of the last tooth of the preceding group. Inasmuch as it is not necessary that each group has the same number of cutter teeth, the increase in the depth of the teeth in the individual groups may vary.

Structural arrangement

Figure 1:
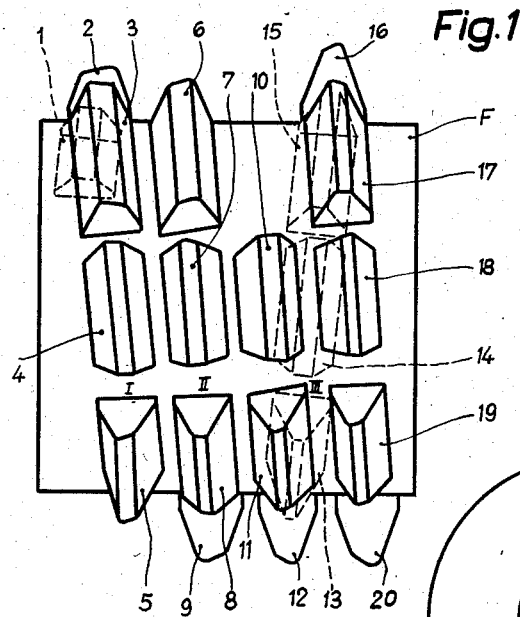
Fig. 1 is a side view of a cutter composed of a cutter body.
Figure 3:
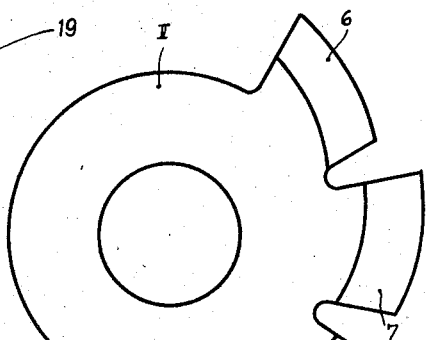
Fig. 3 illustrates the cutter teeth of group II of the cutter of Fig. 1.
Figure 2:
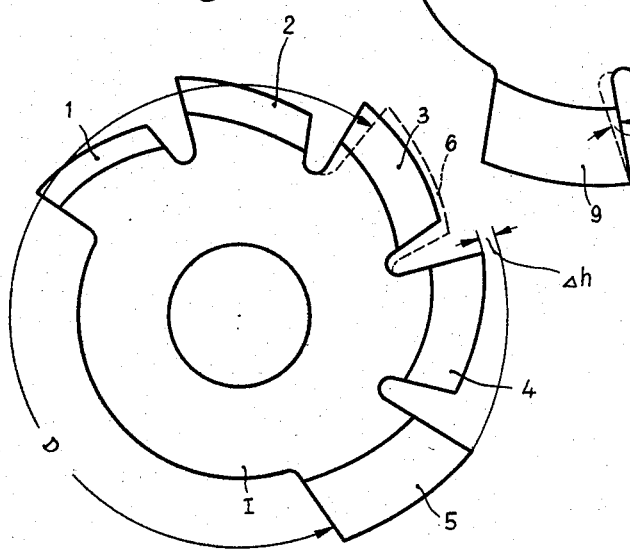
Fig. 2 shows the arrangement of the cutter teeth of group 1 of the cutter according to Fig. 1.

Referring now to the drawings in detail and Fig. 1 thereof in particular, the teeth of the cutter or hob F shown therein are sub-divided into three groups namely the group I, group II and group III. The group I comprises the teeth 1 to 5, and the group II comprises the teeth 6 to 9, while the group III comprises the teeth 10 to 20. Fig. 2 shows the arrangement of the teeth of group I. As will be evident therefrom, the five teeth of this group are not distributed over the entire circumference of the cutter. The distance of the teeth of this group is approximately uniform, whereas the distance between the last tooth of group I, i. e. tooth 5, and the first tooth of group II, i. e. tooth 6, is greater. This distance may amount to from one to five teeth and is represented by the arc D (Fig. 2). The depth of the teeth in the individual groups increases from tooth to tooth. Thus, the increase in depth between tooth 4 and tooth 5 (Fig. 2) is $\Delta h$. The first tooth of each group does not cut with the full profile. Thus, for instance, the first tooth of group II, i. e. tooth 6, has about the same depth as tooth 3 of group I (Fig. 2). Fig. 3 illustrates the arrangement of the teeth of group II. The rake angle is designated in this figure as the angle $\gamma$. The teeth are provided with this angle for yielding a favorable cut.

Figure 4:
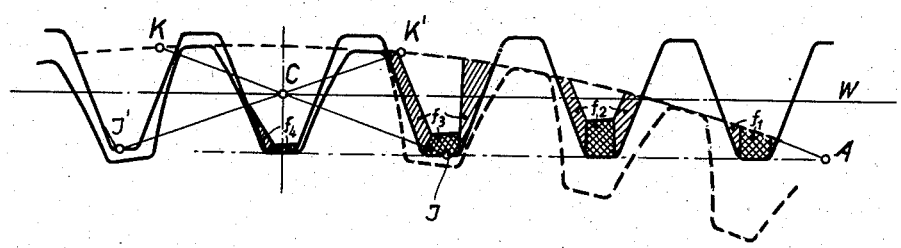
Fig. 4 is a representation of the cutting process seen in axial direction of the work piece.
Figure 5:
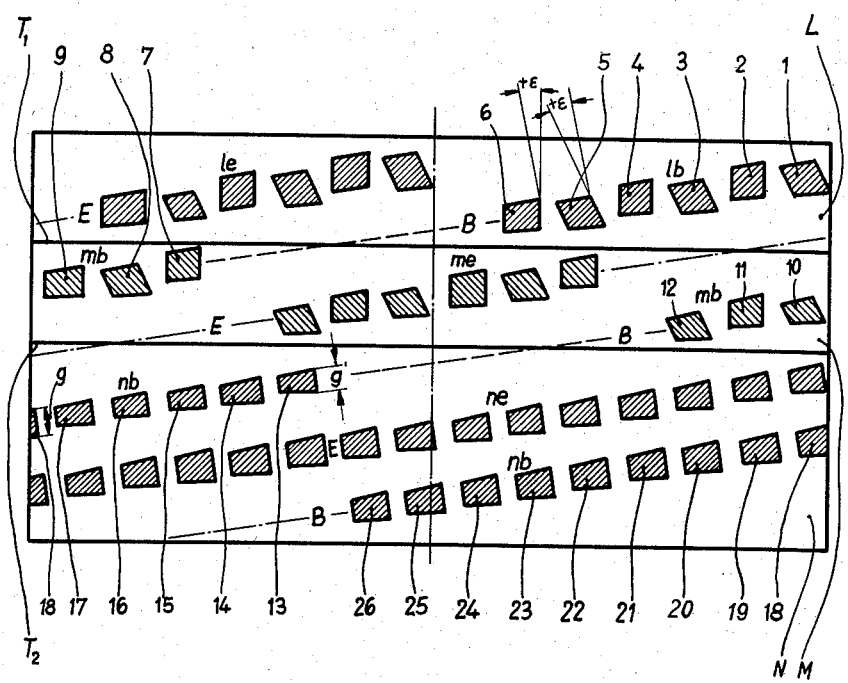
Fig. 5 represents a double thread cutter with three rings, the cutter threads being shown developed into the drawing plane.

Fig. 4 illustrates the chip cross sections $f_1$ to $f_4$ to be removed. The lines J'K' and JK represent the engaging lines, while the line CW represents the rolling line, and the line K'A represents the top circle of the work piece. The point of penetration is designated with the character A. The first working tooth does not attack at this point but closer to the rolling point C. The portion of the chip cross section produced by the top edge of the cutter teeth is indicated by cross hatching, whereas that portion of the chip cross section produced by the flanks is indicated by normal hatching. Due to the gradual increase in depth, only the work of the top edge is taken into consideration. However, as is indicated particularly by the area $f_3$, the portion of the chip cross section of the flank may be considerable. Therefore, it is necessary to impart upon the first teeth of the last group a lateral cutting capacity and to widen these teeth from tooth to tooth. This increase in width is clearly shown in Fig. 5 which illustrates a double cutter sub-divided into three portions for pre-roughing, post-roughing and finishing. The cutter is sub-divided into the rings L, M, N. The plane faces of the rings which engage each other and are perpendicular to the direction of the axis are designated with the characters $T_1$ and $T_2$. The two worm spirals are successively designated with the characters B and E. The first group of the spiral B comprises the teeth 1 to 6 and has been designated with the letters $lb$. The continuation of this spiral is located at the tooth 7 (group $mb$) on ring M. The tooth 13 on ring N in group $nb$ represents the continuation of said spiral. In an analogous manner, the spiral E is subdivided into the groups $le$, $me$, and $ne$. With reference to tooth 13 and tooth 18, it will be evident that the width $g'$ of tooth 13 is less than the width $g$ of tooth 18. The angle at the teeth 5 and 6 represents the axial chip angle of the teeth.

Fig. 6 represents the cutting process seen in axial direction of the cutter and shows the center O of the cutter axis. The cutter tooth of the last tooth group (tooth in the tooth space with chip cross section $f_4$ of Fig. 4) which cuts at the rolling point C has a top radius $r$ and cuts at the full depth $h$ of the tooth space along the semi-circle QR. The work piece therefore performs a complete revolution and during this time the center point of the cutter axis is advanced into the position O' by the distance $s$. The first tooth of the first group starts again cutting approximately at $f_1$ (Fig. 4). When a chip thickness $x$ is desired (Fig. 6) said first tooth cuts with a cutter radius $r'$ along the arc UV. The decrease in the tooth depth between the teeth of the last group and the first tooth of the first group is to be selected in conformity with the desired chip thickness $x$. The same relationship exists between the last tooth of group I and the first tooth of group II. Fig. 7 illustrates a left and a right cutting tooth having their crests or tops inclined in the manner of a roof whereby a lateral bending of the teeth will be avoided when the teeth cut with their edges G. In a manner known per se, the cutting flanks may be provided with chip breakers H.

Fig. 8 shows the rings 30, 31, and 32 of a three part cutter according to the invention. These rings are arranged on a bushing 33 which has a conical and a cylindrical section. The rings 30 and 31 the teeth of which are intended for roughing and secondary roughing are arranged on the cylindrical section of the bushing. Since the teeth of the ring 32 are intended for finishing, this ring is arranged on the conical section of the bushing for purposes of performing a shock-free rotation. The bushing is mounted on the cutter spindle 34 to which the coupling members 36 are keyed by means of keys 35. A rod 37 extends through a corresponding bore of the rings 30, 31 and 32. The said rings are connected with the coupling members 36 in such a manner that the torque is conveyed from said coupling members to said rings. The ends of the rod 37 engage corresponding grooves 38 of the coupling members.

The longitudinal grooves 39 and 40 of the rings 30 and 31 determine the position of said rings with regard to each other during the grinding of the teeth. After removing the rings 30 and 31, the ring 32 may in its respective position be reground on customary grinding machines as finishing cutter without alternating cut. When grinding the rings, the beads 41 thereof are guided in the groove 40, and the teeth of both rings are ground in conformity with one direction of pitch. For purposes of grinding in conformity with the other direction of pitch, one of the rings is offset with regard to the other so that the bead of one ring rests in the groove 40 while the bead of the other ring rests in the groove 39.

The width of the tooth of the first teeth of group III may increase up to the full profile width.

Furthermore the teeth are so designed that they will cut alternately, i. e. one tooth will cut with the left flank and the succeeding tooth will cut with the right flank. In connection therewith the rake angle is selected so that it will be most favorable with regard to the material of the work piece and of the tool. In order to avoid a lateral bending of the teeth when cutting by means of the flanks, the crest or top of the teeth is given a roof shape, i. e. the tops of the teeth are alternately inclined.

This alternate inclination is particularly important for the first cutting teeth of group I. In this connection it will be appreciated that the first cutting teeth have to take off thicker chip cross sections than the finishing teeth while additionally being under a non-symmetric load so that the first cutting teeth, the supporting effect of the protruding head corner is especially advantageous. The cutting starting point, i. e. the point where the first cutter tooth first cuts into the work piece is with a cutter according to the invention, i. e. with a cutter having a reduced length and having cutting starting teeth with a reduced head, located closer to the rolling point than is the case with a cutter having full height teeth.

Due to the elimination of the teeth between two cutting groups, the cutter body may be sub-divided into individual rings which are so arranged that the plane faces which are perpendicular to the direction of the axis are engaging each other. If a tooth group comprises not more than one convolution or turn, the cutter teeth may easily be ground by disconnecting the individual rings from each other so that the grinding disc can freely pass through the tooth spaces. If a plurality of rings the teeth of which do not comprise more than one convolution are to be ground simultaneously, the rings are displaced from their working position and offset with regard to each other in such a manner that the grinding disc can freely pass through the tooth space. By sub-dividing the cutter into a number of rings, it is possible to design the teeth of the first ring for instance for roughing, and to design the teeth of the second ring for secondary roughing, while those teeth of the third ring are designed with full profile for finishing. This above mentioned sub-division may, of course, also be applied to the groups of a non-divided cutter body. More specifically, when sub-dividing the cutter into two roughing groups and one finishing group, the cutting angles of the individual groups or on the individual rings may be varied regardless of whether the cutter is compact or composed of discs. Thus, for instance, in view of the cutting conditions and in order better to maintain the shape of the cutter, the teeth of the finishing portion (group III) when being ground sharp will be less relieved or obtain less cutting clearance than the roughing teeth which are relieved to a greater extent in order to obtain a more favorable cutting angle. The rings are preferably arranged on a bushing with cylindrical and conical sections mounted on the cutter spindle. The torque is conveyed from the cutting spindle through wedges or keys to coupling members, and by the latter through a rod upon the rings.

In order to determine the dimensions of the teeth and the number of the teeth in the individual groups as well as the increase in depth from one tooth to the next tooth, the load on the cutter teeth at the start of the cutting step and the load on the cutter teeth during the further cutting operation is to be considered. During the start of the cutting operation, the areas of the chips to be removed with each circumference of a group are to be distributed uniformly among the teeth of said group. This will determine the number of the teeth and the increase in height from tooth to tooth in the individual groups. While the work piece performs approximately a complete revolution, the shaft of the cutter is advanced or fed in a direction parallel to the axis of the work piece by an amount corresponding to a revolution of the work piece. This feed is the customary working feed measured in millimeters or inches per revolution of the work piece. The dimensions of the teeth, the increase in depth of the teeth and the number of the teeth will therefore during the further cutting operation depend on the desired chip thickness to be produced by the tooth while widening the existing tooth space in axial direction of the work piece. In most instances, the dimensions of the teeth will be more important with regard to the further cutting operation than the dimensions of the teeth during the starting phase of the cutting operation.

The last group of the cutter works at both sides of the rolling point. In this group, the teeth must be present without interruption so that the profile of the tooth flank of the work piece is completely enveloped.

While the invention has been described in connection with hobs for the production of gears, the invention may also be employed with hobs for making keyways or other profiles to be rolled and may also be employed with cutters having a cone-shaped body.

It is to be understood that the present invention is, by no means, limited to the particular construction shown in the drawings but also comprises any modifications within the scope of the appended claims.

What I claim is:

1. A hob having its teeth arranged along at least one helix, in which the teeth arranged along one and the same helix are subdivided into groups and in which some of said groups comprises roughing teeth and one of said groups comprises finishing teeth, each tooth of one and the same group being substantially evenly spaced from an adjacent tooth of the group, and the first tooth of each group being spaced from the last tooth of the preceding group by a distance substantially equalling from one to five times the distance between two adjacent teeth of one and the same group, the arrangement being such that the depth of the teeth of one and the same group which comprises roughing teeth only increases from tooth to tooth in cutting sequence thereof and that the first tooth of each group has a lower depth than the last tooth of the preceding group.

2. In combination in a hob having its teeth arranged along at least one helix: a cutter spindle, a sleeve having a conical section and a cylindrical section, a first ring member mounted on and rotatably connected to said conical section and provided with finishing teeth, a second ring member arranged adjacent said first ring member and mounted on said cylindrical section for rotation therewith, and a third ring member arranged adjacent said second ring member and mounted on said cylindrical section for rotation therewith, said second and third ring members being provided with roughing teeth only and comprising left and right cutting teeth, the teeth of said three ring members being arranged along at least one helix, and the teeth along one and the same helix being subdivided into groups, the arrangement being such that each tooth of one and the same group is substantially evenly spaced from an adjacent tooth of the same group, and that the first tooth of each group is spaced from the last tooth of the preceding group by a distance substantially equalling from one to five times the distance between two adjacent teeth of one and the same group, the depth of the teeth of one and the same group which comprises roughing teeth only increasing from tooth to tooth in cutting sequence thereof and the first tooth of each group having a lower depth than the last tooth of the preceding group, said second and third ring members and said sleeve being provided with groove and key means for selectively securing said second and third ring members in working position for cutting a work piece or in different grinding positions to allow in one position joint grinding of the left roughing teeth of said second and third ring members and in another position joint grinding of the right roughing teeth.

References Cited in the file of this patent

UNITED STATES PATENTS

| | | |
|---|---|---|
| 963,464 | McGregor | July 5, 1910 |
| 991,463 | Steiner | May 2, 1911 |
| 1,343,276 | Olson et al. | June 15, 1920 |
| 1,495,067 | Conklin | May 20, 1924 |
| 1,649,631 | Wheattley | Nov. 15, 1927 |
| 1,728,198 | Brussel | Sept. 17, 1929 |
| 1,873,158 | Simmons | Aug. 23, 1932 |
| 1,877,104 | Wildhaber | Sept. 13, 1932 |
| 1,941,790 | Davis | Jan. 2, 1934 |
| 1,998,665 | Flury | Apr. 23, 1935 |
| 2,216,628 | Richmond | Oct. 1, 1940 |
| 2,414,790 | Barnard | Jan. 28, 1947 |
| 2,491,720 | Frei | Dec. 20, 1949 |